US005456077A

United States Patent [19]

Bartlett

[11] Patent Number: 5,456,077

[45] Date of Patent: Oct. 10, 1995

[54] REMOTE UNLOADER HYDRAULIC VALVE SYSTEM

[75] Inventor: William P. Bartlett, Dodge Center, Minn.

[73] Assignee: McNeilus Truck and Manufacturing, Inc., Dodge Center, Minn.

[21] Appl. No.: 231,314

[22] Filed: Apr. 22, 1994

[51] Int. Cl.[6] .............................. F16D 31/02; F15B 11/00

[52] U.S. Cl. .............................. 60/422; 60/426; 60/468; 60/494; 91/511

[58] Field of Search .............................. 60/420, 422, 426, 60/468, 494; 91/511, 461

[56] References Cited

U.S. PATENT DOCUMENTS 4,066,004 1/1978 Alcalay .............................. 91/511 X
4,986,074 1/1991 Hahmann et al. .............................. 60/468
5,077,974 1/1992 Kamikawa et al. .............................. 60/468 X
5,197,284 3/1993 Gartner .............................. 60/468 X
5,201,176 4/1993 Oshima .............................. 60/422

*Primary Examiner*—Edward K. Look
*Assistant Examiner*—Hoang Nguyen
*Attorney, Agent, or Firm*—Haugen and Nikolai

[57] ABSTRACT

A vehicle mounted hydraulic system is provided with a flow control system that allows and maintains sufficient fluid flow through the pump, regardless of pump speed or fluid usage requirements by the hydraulically operated devices, to prevent cavitation or undue pump wear.

5 Claims, 3 Drawing Sheets

REMOTE UNLOADER HYDRAULIC VALVE SYSTEM

BACKGROUND OF THE INVENTION

I. Field of the Invention

The present invention is directed generally to the field of hydraulic systems operated by intermittently or continuously operated fluid pumps and, more particularly, to vehicle mounted hydraulic systems utilizing gear pumps which are rotated by the vehicle motor. The present invention focuses on a flow recirculation control system which allows essentially the pump demand to be met at all times. This prevents overheating and shortened pump life due to starvation/cavitation problems.

II. Discussion of the Related Art

Vehicle mounted hydraulic systems are typically powered by gear pumps. These hydraulic pumps may operate anytime the truck motor is running, i.e., continuously, or be driven from a power take-off (PTO) so that the pump can be turned off or mechanically disconnected when not in use. Such systems at a given time are typically characterized as being in one of three defined modes of operation. These include an ON mode in which the pump is running and one or more hydraulic devices are being operated, and an OFF mode in which the pump may or may not be running but no hydraulic devices are being operated. The third mode is characterized as an OVERSPEED mode in which the pump is turning at a speed at which, under normal conditions, it will deliver too much flow to the system with respect to the then current need.

Prior systems typically employ what is known as a "dry valve" system in which a valve located on the suction side of the pump— when the pump is in the OFF or OVERSPEED mode—meters a small amount of hydraulic fluid which is allowed to flow through the pump as a minimum supply when the system is running. Unfortunately, the minimum amount often is but a small fraction of the actual pump demand, so that the pump is forced to operate in a starved condition. This type of arrangement is typical of prior systems and, while operable, is undesirable because operation under starved condition may result in higher than normal pump operating temperatures and undue wear on the pump. For example, if the truck or other vehicle carrying a hydraulic system having a continuously operated pump is driving down the road at high speed and the hydraulic system is in the OFF mode, the pump could still be turning fast enough to ask for perhaps 60–70 gallons of oil per minute. The dry valve system, however, meters only an average of, for example, two gallons of oil per minute into the pump producing starvation cavitation which increases the noise, heat generated and wear on the pump parts.

An illustration of such a prior hydraulic system for one type of refuse truck is illustrated by the schematic hydraulic diagram of FIG. 1. The system includes a fluid reservoir 10 equipped with a vented reservoir filler cap 12 and return line filter 14. The reservoir 10 is connected to a reservoir outlet/pump inlet suction line 16. A dry valve is depicted at 18 connected to the inlet 20 of a gear pump 22. The outlet 23 of the gear pump 22 is connected by line 24 to the inlet section 26 of a first main spool valve which includes a truck tailgate operating section 28, a refuse ejector operating spool valve section 30 and an outlet section 32. The tailgate operating section 28 is connected to a tailgate operating cylinder 34 and the ejector section is connected with a telescoping ejector operating cylinder as at 36. An additional hydraulic pressure line 38 supplies high pressure hydraulic fluid to a packer/slide spool valve inlet section at 40 which connects with spool valve sections 42, 44, 46 and 48 which operate additional respective cylinders as illustrated at 50, 52 and 54 to provide other tipping, sliding, packing and, if desired, winch functions. A main low pressure hydraulic return line is shown at 56.

It is clear from the schematic diagram of FIG. 1 that all of the hydraulic fluid flowing from the pump outlet through high pressure line 24 must flow through the spool valves prior to returning to the reservoir 10. Demand may be adequate for pump output when one or more of the cylinders is being operated. During periods of no demand, when none of the hydraulic cylinders is being operated under this condition, the permissible flow through the pump is controlled by dry valve 18. The pump operates with an undersupply of hydraulic fluid and thereby experiences cavitation which causes the pump to be noisy, run at a much higher than desired temperature and generally shortens pump life. If low flow problems could be alleviated, the maintenance with regard to such system could be greatly reduced.

SUMMARY OF THE INVENTION

The present invention solves low flow problems by the provision of a new flow control valving system which not only permits but also maintains sufficient fluid flow through the pump regardless of pump speed or instantaneous fluid demand requirements. The system allows the pump to enjoy quieter, lower temperature operation, in which wear on the pump is reduced such that significantly longer pump life is possible.

In the preferred embodiment, the flow control valving system is in the form of a relief valve or remote unloader system connected between the outlet of the pump and a spool valve system which includes a by-pass return line to the reservoir. The entire remote unloader of the invention may be self-contained in a single machined block which is readily connected as a retrofit into existing hydraulic systems in addition to being easily incorporated in new systems. In retrofitting the flow control system of the invention with prior systems, it is necessary only to remove the dry valve before connecting the unloader block into the system.

In its preferred embodiment, the machined block of the invention is in the form of a hard, preferably anodized, aluminum, metal block computer numerical control (CNC) machined to a high tolerance to accept three cartridges and an orifice. The three cartridges include a logic valve, a solenoid-operated normally open bleed return valve and a pilot operated bleed relief check valve. Appropriate inlet and outlet ports together with internal connecting passages, including a through passage which connects the output of the pump directly with the existing spool valve, are provided.

With regard to the remote unloader or flow control valving system of the invention, in the preferred embodiment, the logic valve is in the form of a pressure operated logic valve. Generally, the logic valve is a slave to the relative hydraulic forces which cause it to shift against the side having the lesser amount of force.

The logic valve has an inlet port connected to a passage in parallel with a passage connecting the inlet of the spool valve system to the output of the pump and a main output port which connects to a passage leading to a port connected to an auxiliary low pressure by-pass return line to the reservoir. The logic valve is operated by an integral fluid-bleed pressure operator which includes a bleed port which opens the main outlet port based on pressure in the inlet passage to allow return flow directly to the by-pass return line to the reservoir. The fluid bleed pressure operator also contains a small orifice (typically 0.02–0.06 inch diameter). An outlet port bleeds a small amount of hydraulic fluid beyond the logic valve. To further control the opening of the logic valve, a normally open bleed return valve is provided in series with the logic valve which normally connects the bleed port of the logic valve with the by-pass return line to the reservoir.

An electric operated solenoid is provided for closing the normally open bleed return valve when the hydraulic system is in the ON mode, i.e., when normal return flow keeps the pump from being starved. This closes the by-pass port of the logic valve to direct the entire output of the pump to the spool valve.

In addition, a small diameter pilot line is provided between the high pressure output line from the pump and another port of the flow control system block. Internal passages connect the pilot line port to a pilot-operated bleed relief check valve in the relief valving system which is connected in parallel with the normally open bleed return valve and which is opened by pilot line pressure to provide an alternate bleed return path during an OVERSPEED condition or whenever the pump output flow is greater than the demand of the hydraulic system when it is in the ON position, i.e., such as would cause the hydraulic operations to move at a rate higher than that desired when the normally open bleed return valve is closed. The pilot-operated bleed valve is further provided with a small diameter orifice-limited (also typically 0.02–0.06 inch diameter) relief drain which is connected in parallel with the other passages leading to the by-pass return port of the unloader block.

In operation, for example, when the hydraulic system is in the OFF mode but the pump is running, hydraulic fluid is simply circulated from the pump into the block of the flow control or unloader system of the invention by-passing the spool valve system, continuing through the inlet port of the logic valve, which is held open by the fluid bleed pressure operator, and is returned to the reservoir through the by-pass port. When the hydraulic system is in the ON position, the normally open bleed return valve is closed so that the output of the pump is delivered to the spool valve system to operate the hydraulic functions. Whenever the speed of the gear pump is such that the fluid delivered is in excess of the system requirements, this is known as the OVERSPEED mode, and this is signaled by an increase in delivery pressure in the pilot-operated bleed relief line which opens the pilot-operated bleed relief check valve which, in turn, allows the bleed fluid from the logic valve to by-pass the closed bleed return valve which, in turn, allows excess fluid to by-pass the spool valve system and return directly to the reservoir. In this manner, the fluid traversing the pump is not limited so that the pump remains cool and is not subjected to cavitation.

BRIEF DESCRIPTION OF THE DRAWINGS

In the drawings, wherein like numerals are utilized to designate like parts throughout the same.

DETAILED DESCRIPTION

Figure 1:
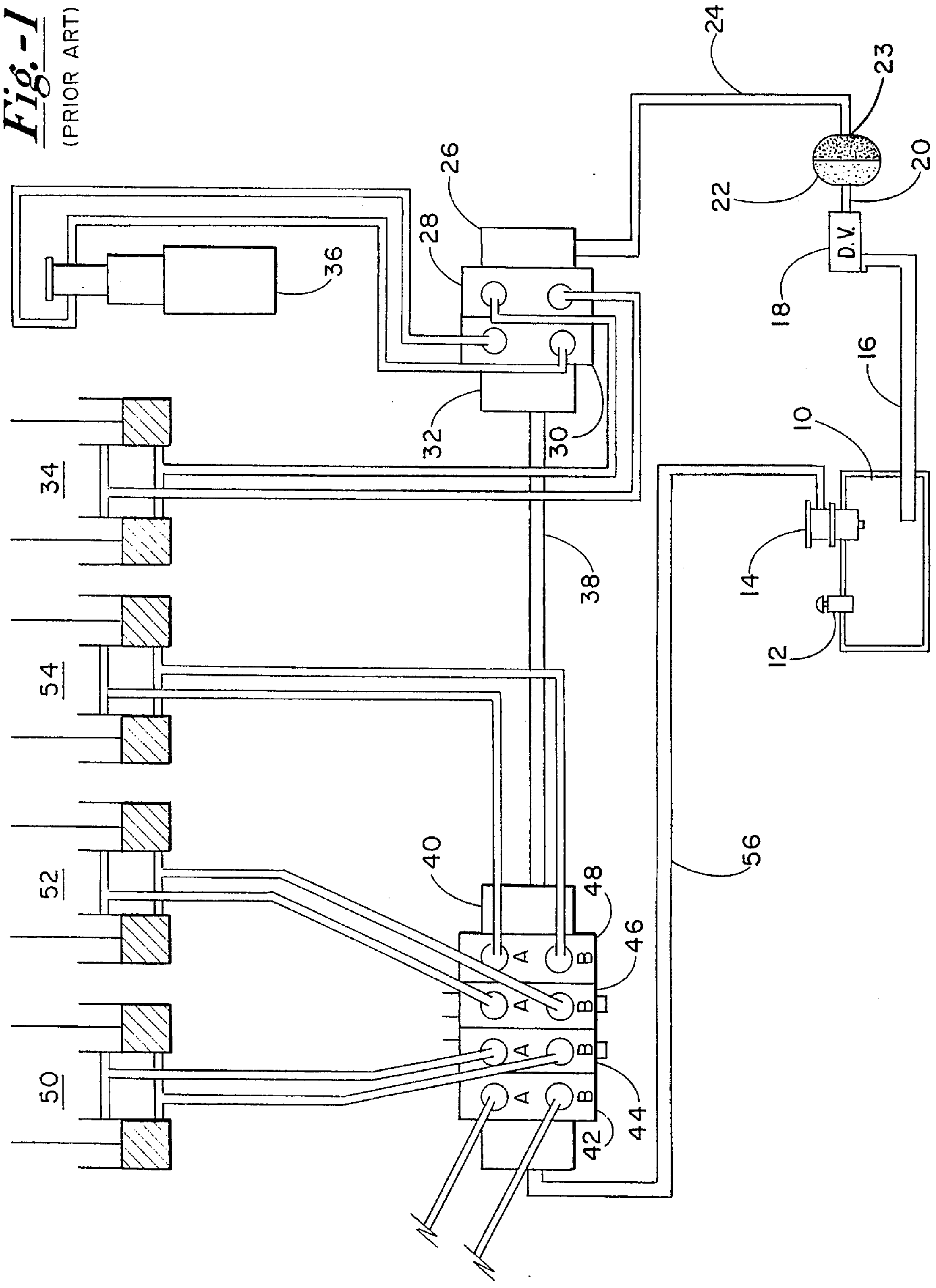
Fig.-1 (PRIOR ART)
FIG. 1 is a schematic hydraulic diagram of a prior art vehicle-mounted system utilizing a dry valve.

As previously described with regard to FIG. 1, the Figures illustrate a typical vehicle-mounted hydraulic system. The particular system is one for use with a rear loading refuse carrying vehicle; it will be appreciated, however, that while the illustrative embodiment may seem somewhat specific, it is meant by way of example only and is in no way intended to limit the applicability of the invention. For example, in any system where the pump runs continuously regardless of demand, including other types of truck mounted hydraulic system, may also incorporate the invention.

In the prior system, hydraulic fluid supplied from a reservoir 10 and metered through a dry valve 18 is pumped by pump 22 through spool valve systems which operate a plurality of cylinders to accomplish the various functions associated with receiving, packing and ejecting refuse in a well-known manner. The dry valve 18 limits flow to the pump 22 to about two gallons per minute (GPM) or less when the hydraulic functions are not being operated, i.e., when the system is in the OFF or OVERSPEED mode.

Figure 2:
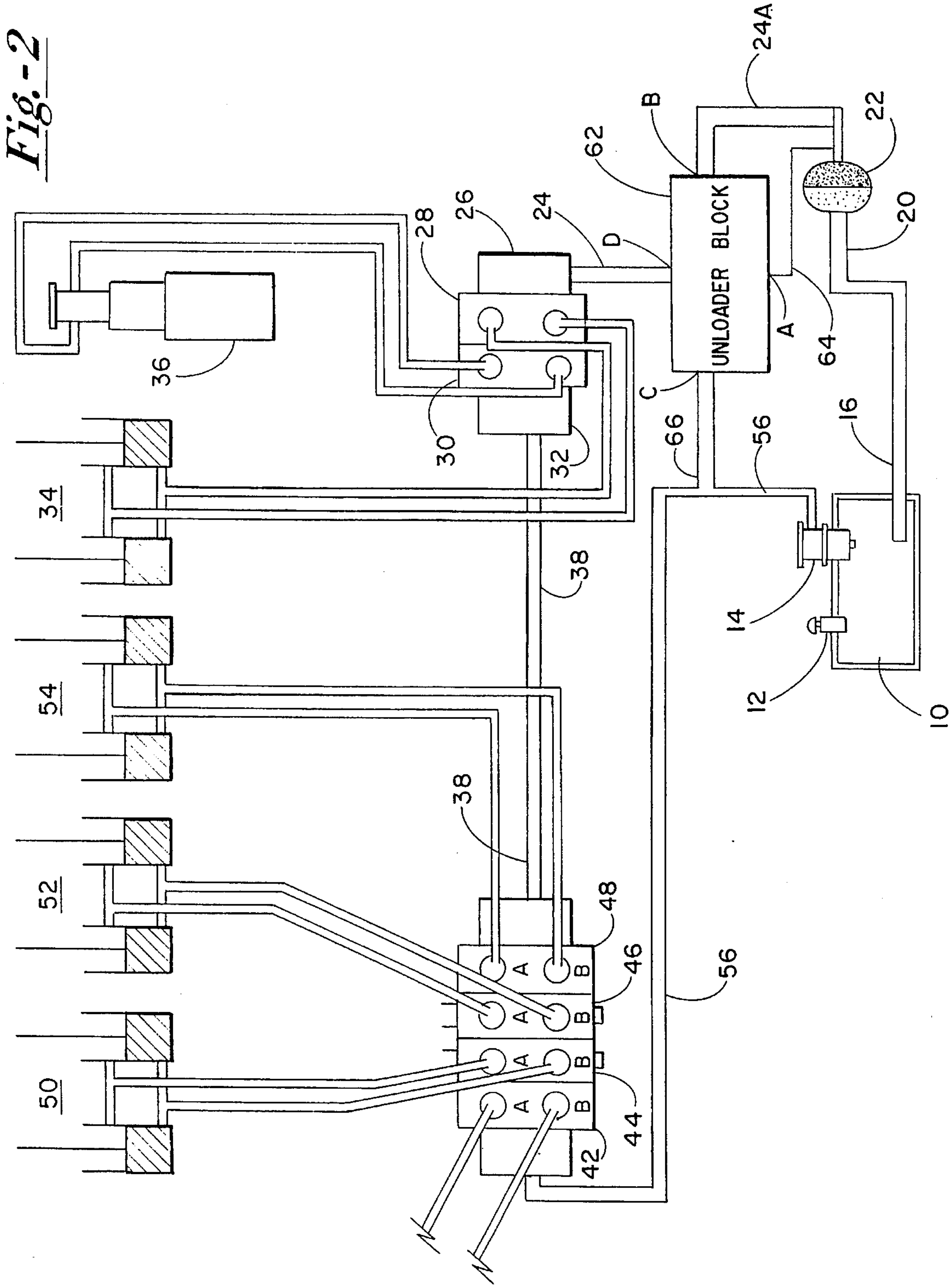
FIG. 2 is a schematic diagram of a vehicle-mounted system similar to that depicted in FIG. 1 but using the flow control system of the invention.

FIG. 2 is a schematic diagram much like that of FIG. 1 as modified to include the flow control or remote unloading system of the invention. This includes a remote unloader block 62 having an inlet port B connected to high pressure line 24 and an inlet port A connected to a pump flow control signal pilot pressure line 64 of diminutive diameter. The unloader block 62 is further provided with an outlet port C connected to a by-pass return line 66 which is connected to the reservoir via the fluid return line and an outlet port D connected to the inlet of the spool valve inlet section 26. While shown separately in the schematic representation of FIG. 2, the remote unloader block may conveniently be mounted directly to the pump.

Figure 3:
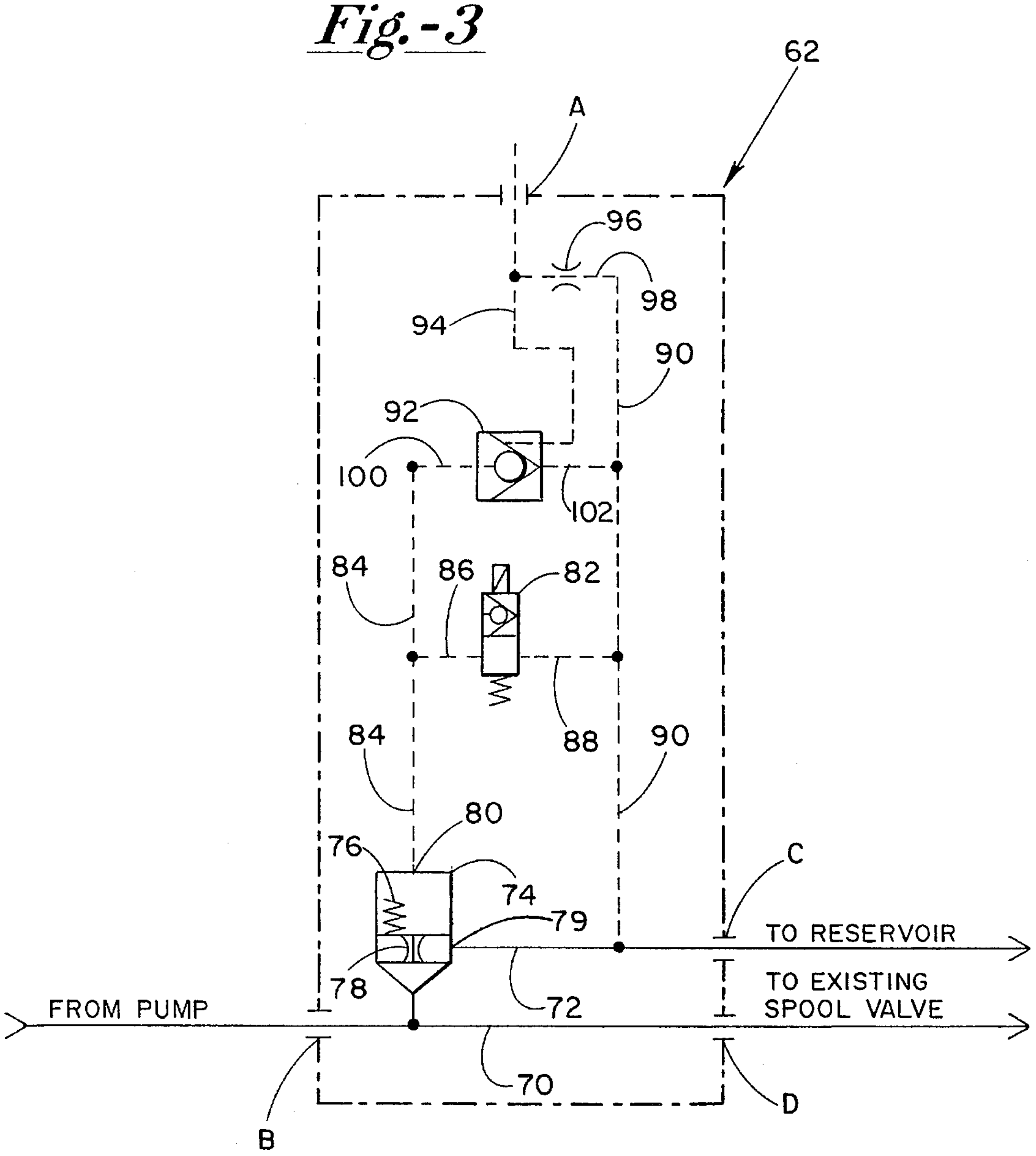
FIG. 3 is a further schematic block diagram of the flow control means of the invention itself.

The remote unloader block itself, complete with machined internal passages and cartridge inserts, is shown in greater detail in the schematic diagram of FIG. 3. The block is preferably a one-piece aluminum block such as may be conveniently machined on a CNC machine. As can be seen in that Figure, the flow from the pump received at port B is conducted either via a machined internal passage 70 directly out exit port D to the spool valve system or via by-pass internal passage 72 through outlet port C returning back to the reservoir. This is determined, at least in part, by the operation of logic valve 74 which is provided with bias spring 76, bleed orifice 78, by-pass exit port 79 and bleed port 80. The bleed port 80 connects the logic valve with a normally open bleed return valve 82 via machined passages 84 and 86, output passage 88 of valve 82 is connected via machined passage or line 90 to passage 72 and thus to common port C. A pilot operated bleed relief check valve 92 is also provided which is operated by a pressure signal from port A via machined passage 94. A return drain relief passage includes orifice 96 in line 98 which returns to common machined passage or line 90.

In operation, with the truck motor running and the hydraulic system in the OFF position, high pressure hydraulic fluid from pump 22 is conducted to the remote unloader block via lines 24A and 64 to inlet ports B and A, respectively, thereby pressurizing internal passages 70 and 94 alike. As no hydraulic functions are being performed, there is little or no flow through exit port D to the spool valve system. Hydraulic fluid in line 70 enters logic valve 74 and via orifice 78 compresses spring 76 to open by-pass exit port 79 thereby allowing return flow to the reservoir via internal passage 72 which exits through port C, returning via the low pressure fluid return system. A small amount of hydraulic fluid in logic valve 74 is bled via bleed port 80 through lines 84, 86, 88 and 90 inasmuch as the valve 82 is in its normally open position.

When the hydraulic system is positioned in the ON position, i.e., when one or more cylinders are being operated, normally open bleed return valve 82, which is typically electrically closed as by a 14 volt continuous duty solenoid coil, is closed by manually operating a switch on the truck dash. This prevents flow through line 84 which allows the spring 76 to again close the by-pass exit port 79 of logic valve 74. The hydraulic fluid from the pump is then conducted along passage 70 to exit port D, leading to the spool valve system to operate the hydraulic devices. Should the pump reach an OVERSPEED condition, a pressure signal in passage 94 will cause normally closed check valve 92 to open, thereby allowing flow through passages 100 and 102 which, in turn, causes a pressure drop in passage 84 which allows logic valve 74 to again open port 79 so that the excess hydraulic fluid may be returned to the reservoir via port C of the remote unloader block 62. In this manner, check valve 92 opens a controlled amount as necessary during operation of the hydraulic system.

In this manner, pump flow is maintained in line with pump demand and/or actual output at any speed and without regard to hydraulic system demand. The invention provides an easily retrofitted device that is applicable to a variety of vehicle-operated hydraulic systems including, for example, with respect to refuse trucks, front loading, side loading, recycling and other hydraulic applications in the refuse industry, which may presently use a dry valve hydraulic pump.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications both as to equipment and procedure details can be accomplished without departing from the scope of the invention itself.

We claim:

1. In a hydraulic system characterized by the ability to operate in OFF, ON or OVERSPEED modes, the system having a fluid reservoir for supplying and string hydraulic fluid; a normally constantly running pump means and having a fluid throughput based on the speed of the pump means, the pump means further having an intake connected to receive hydraulic fluid from the reservoir and having a relatively high pressure discharge fluid outlet; a spool valve system for supplying high pressure hydraulic fluid on demand to operate one or more hydraulic devices, the spool valve system being connected with the outlet of the pump means; said one or more hydraulic devices being connected thereto and a return line for returning fluid used by the one or more hydraulic devices to the reservoir, the improvement comprising:

flow recirculation control means including a relief valve system connected between the outlet of the pump and the spool valve system and a by-pass return line to the reservoir, said relief valve system further comprising:

(1) a logic valve means in the form of a pressure operated valve having an inlet port connected with the outlet of the pump and an outlet port connected with the inlet of the spool valve system, a fluid-bleed pressure operator including a bleed port, and a by-pass port opened by the bleed pressure operator and connected to the bypass return line;

(2) a normally open bleed return valve in series with the logic valve and connecting the bleed port thereof with the by-pass return line; and (3) valve operating means for closing the normally open bleed return valve when the spool valve demand increases, thereby causing the by-pass port of the logic valve to close.

2. The apparatus of claim 1 further comprising:

(a) a pilot line connected between the outlet of the pump means and the relief valving system; and (b) pilot-operated bleed relief check valve in the relief valving system connected in parallel with the normally open bleed return valve and which is opened by pilot line pressure to allow bleed return and opening of the by-pass port of the logic valve when pilot line pressure exceeds a predetermined level and the normally open bleed return is closed.

3. The apparatus of claim 2 further comprising flow limited relief drain return means connected to the pilot line.

4. The apparatus of claim 1 wherein the pump is operated intermittently with respect to the continuous operation of the motor.

5. A flow control system for a vehicle mounted hydraulic system characterized by the ability to operate in OFF, ON or OVERSPEED modes, the system having a fluid reservoir for supplying and storing hydraulic fluid; a continuously operated pump means having an intake connected to receive hydraulic fluid from the reservoir and having an outlet for pressurized fluid; a spool valve system connected to receive pressurized fluid from the pump means and to supply said pressurized fluid to operate one or more hydraulic devices; the one or more hydraulic devices being connected through the spool valve system; and a low pressure return line for returning spent fluid from the one or more hydraulically operated devices to the reservoir, the flow control system being further characterized by:

(a) a relief valve system connected between the outlet of the pump means and the spool valve system and including a by-pass return line to the reservoir, which allows and maintains sufficient fluid flow through the pump means regardless of pump speed or fluid usage requirements by the one or more hydraulically operated devices, the relief valve system further comprising:

(1) a logic valve in the form of a pressure operated valve having an inlet port in series with the inlet of the spool valve system, a fluid-bleed pressure operator including a bleed port, and a by-pass port opened by the bleed pressure operator and connected to the bypass return line;

(2) a normally open bleed return valve in series with the logic valve and connecting the bleed port thereof with the by-pass return line;

(3) valve operating means for closing the normally open bleed return valve when the system is in the ON mode, the spool valve demand increasing, thereby causing the by-pass port of the logic valve to close;

(4) a pilot line connected between the outlet of the pump means and the relief valve system; and (5) pilot-operated bleed relief check valve in the relief valve system connected in parallel with the normally open bleed return valve and which is opened by pilot line pressure to allow bleed return and opening of the by-pass port of the logic valve when pilot line pressure exceeds a predetermined level and the normally open bleed return valve is closed.

* * * * *